United States Patent [19]

Bellah

[11] Patent Number: 4,541,307
[45] Date of Patent: Sep. 17, 1985

[54] START SWITCH MECHANISM
[75] Inventor: Glen R. Bellah, Bolingbrook, Ill.
[73] Assignee: J. I. Case Company, Racine, Wis.
[21] Appl. No.: 544,924
[22] Filed: Oct. 24, 1983
[51] Int. Cl.[4] ............................................. B60K 41/04
[52] U.S. Cl. .................................... 74/850; 200/61.91
[58] Field of Search ......................... 74/850; 200/61.91

[56]  References Cited
U.S. PATENT DOCUMENTS

| 3,242,280 | 3/1966 | Krieger | 200/61.91 |
| 3,534,637 | 10/1970 | Tomlinson | 74/850 |
| 4,415,786 | 11/1983 | Takada et al. | 200/69.91 |
| 4,491,039 | 1/1985 | Benedek et al. | 74/850 |

FOREIGN PATENT DOCUMENTS 600629  9/1955  Canada .................................. 74/850
2426319 12/1974  Fed. Rep. of Germany ........ 74/850

Primary Examiner—George H. Krizmanich
Assistant Examiner—Dirk Wright
Attorney, Agent, or Firm—Cullen, Sloman, Cantor, Grauer, Scott & Rutherford

[57] ABSTRACT

A start switch mechanism for synchronization of a starting circuit actuation with a neutral zone of a vehicle transmission, thereby allowing an operator to start the vehicle in neutral gear, comprises a switch mounted on one shaft and an actuating pin mounted on another shaft. The pin trips the switch, thereby actuating the starting circuit, only when both shafts, each of which being connected to a different series of range gears, are aligned in a predetermined position which corresponds to a neutral zone of the transmission.

6 Claims, 2 Drawing Figures

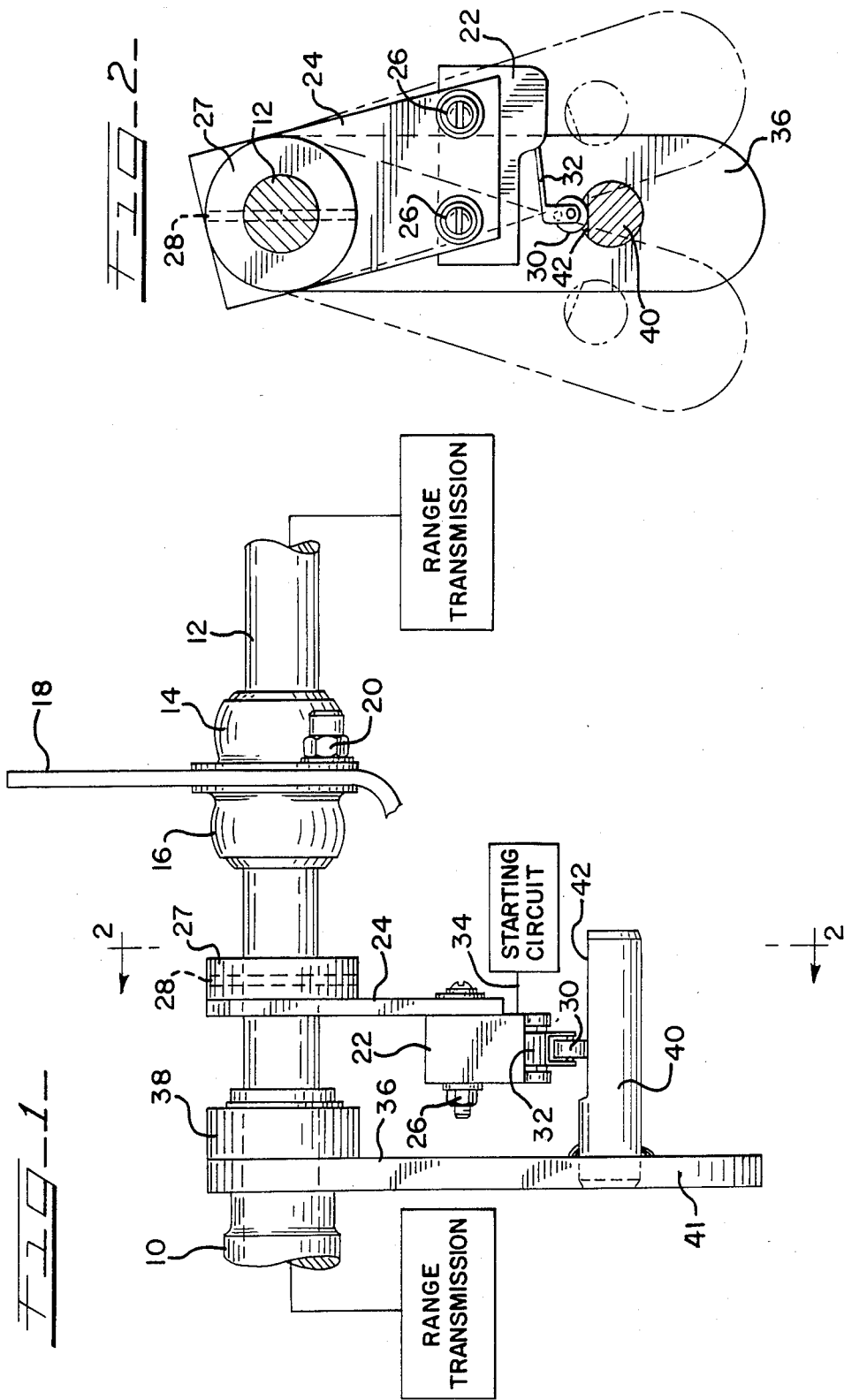

START SWITCH MECHANISM

BACKGROUND OF THE INVENTION

Field of the Invention

This invention pertains to start switch mechanisms and more particularly to a vehicle start switch assembly permitting the engine start when a vehicle transmission is in neutral gear.

INFORMATION DISCLOSURE STATEMENT

The motor vehicles, such as tractors, with a range transmission have a conventional start switch, which is mounted on the firewall and actuated by pressing a clutch pedal to a disengaged position. This allows the operator to turn the key switch to start the tractor. It was necessary to hold the clutch pedal in the disengaged position in order to turn the ignition key. An undesirable and accidental engagement of gears while actuating the starting circuit was thus prevented.

The below described subject invention eliminates a necessity of the clutch disengagement while actuating the starting circuit by utilizing a single switch.

SUMMARY OF THE INVENTION

According to the present invention, a start switch mechanism for synchronization of a starting circuit actuation with a predetermined position of gears in a motor vehicle transmission comprises a first shaft connected with the first series of gears in the transmission for selective engagement thereof. A second shaft is connected with a second series of gears in the transmission for selective engagement thereof. Switch means mounted on the first shaft is connected to a vehicle starting circuit. Actuating means is mounted on the second shaft and engaging the switch means for completing the starting circuit. The actuating means contact the switch means only when the first and second shaft are in the predetermined position, which is a neutral position in the vehicle range transmission.

BRIEF DESCRIPTION OF THE DRAWINGS

FIG. 1 is a partially schematic side view of a start switch mechanism; and

FIG. 2 is a cross-sectional view taken substantially along the lines 2—2 in FIG. 1.

DESCRIPTION OF THE PREFERRED EMBODIMENT

The invention may be carried into practice in a number of ways but one specific embodiment will be described by way of example only.

Referring now to the drawings wherein reference characters designate like or corresponding parts throughout the several views, there is shown in FIGS. 1 and 2 a motor vehicle, such as a tractor or the like, with a range transmission including "low" and "reverse" range gears engageable by the outer shaft 10 and "med" and "high" range gears engageable by the inner shaft 12. The shaft 12, coaxially disposed within the outer shaft 10, is supported by bearings 14 and 16, which are mounted on the support plate 18 by bolts 20. A start switch 22, which can be a micro switch or any other tripping mechanism, is attached to a lever 24 by bolts 26. The lever 24 is mounted on the shaft 12 by its hub 27 extending along thereof and secured to the shaft 12 by a coil spring pin 28 inside a cross-hole. This provides a releasable attachment of the lever 24 to the inner shaft 12.

The switch 22 includes a roller 30 being supported by a pivoting bracket 32, which projects outwardly of the switch 22. The bracket 32 closes the starting circuit via the electrical connection 34, when the bracket 32 is biased into its upper or actuating position.

An arm 36, integral with its hub or ring portion 38, is secured to the outer shaft 10 and rotatable therewith. A switch actuation pin 40 welded to the arm 36 extends outwardly from the arm free end 41 and reciprocably moves with the shaft 10. The actuating pin 40 having a platform 42 contacts the roller 30, thereby biasing the bracket 32 in its upward position. Thus, the starting circuit can be completed and the engine can be started when two shafts are aligned in the neutral or other predetermined position. When either shaft assembly is rotated into a gear range other than neutral, the microswitch 22 and the switch actuation pin 40 are not aligned and no current can pass through the starting circuit.

One of the main advantages of the new start switch mechanism is the synchronization of the starting circuit actuation with the neutral zone of the transmission. This will allow the operator to start the tractor only in neutral gear.

Another feature of this new start mechanism is that it requires only turning an ignition key to start the tractor, thereby eliminating a necessity to keep the clutch pedal in the disengaged position or use clutch pedal at all.

Another advantage of this switch system is that only a single switch is employed, and therefore no need for use of a switch per each shaft should arise.

While one embodiment of the invention has been illustrated and described herein, various changes and modifications may be made therein without departing from the spirit of the invention as defined by the scope of the appended claims.

What is claimed is:

1. A start switch mechanism for synchronization of a starting circuit actuation with a predetermined position of gears in a motor vehicle transmission:
   a first shaft connected with a first series of gears and selectively engaging said gears in said transmission;
   a second shaft connected with a second series of gears in said transmission for selective engagement thereof;
   a switch means mounted on said first shaft and connected with said vehicle starting circuit;
   an actuating means mounted on said second shaft and engaging said switch means for completing said starting circuit;
   said actuating means contacting said switch means when said first and second shaft being placed in a position corresponding to said predetermined position.

2. The invention according to claim 1, and said first shaft being coaxially disposed and rotatable within said second shaft.

3. The invention according to claim 1, and said actuating means comprising a pin protruding from an arm rigidly secured to said second shaft.

4. The invention according to claim 1, and said switch means secured to a lever attached to said first shaft.

5. The invention according to claim 1, and said predetermined position being a neutral position in said transmission.

6. A start switch mechanism for synchronization of a starting circuit actuation with a predetermined position of gears in a motor vehicle transmission:

a first shaft connected with a first series of gears and selectively engaging said gears in said transmission;

a second shaft connected with a second series of gears in said transmission for selective engagement thereof;

a switch means mounted on said first shaft and electrically connected with said vehicle starting circuit;

an actuating means mounted on said second shaft and engaging said switch means for completing said starting circuit;

said actuating means contacting said switch means when said first and second shaft being aligned for a contact position being correspondent to said predetermined position;

said actuating means comprising a pin protruding from an arm rigidly secured to said second shaft;

said switch means secured to a lever attached to said first shaft; and said predetermined position being a neutral gear position in said transmission.

* * * * *